United States Patent Office 3,479,140
Patented Nov. 18, 1969

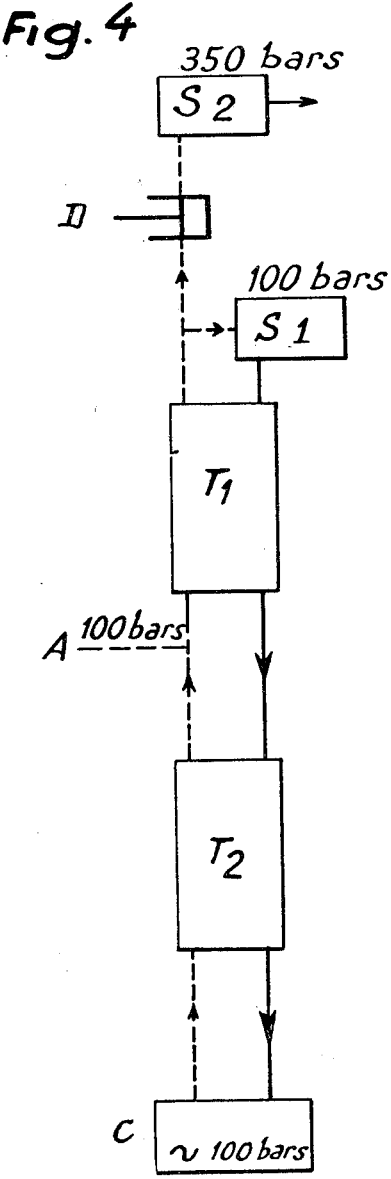
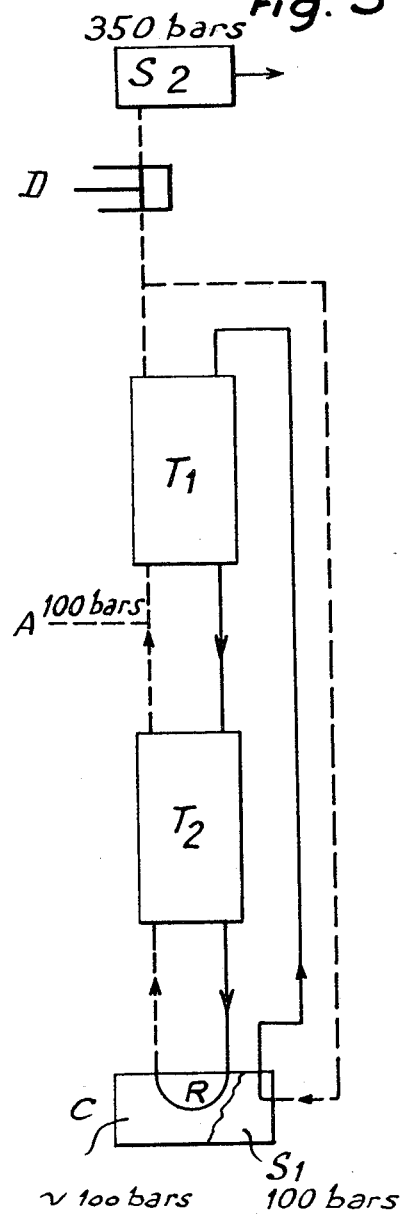

3,479,140
ISOTOPE EXCHANGE BETWEEN A DEUTERATED GAS AND AMMONIA
Etienne Roth, Sevres, and Bernard Lefrancois, Bully-les-Mines, France, assignors to Houilleres du Bassin du Nord & du Pas-de-Calais, Douai, Nord, France, and Commissariat a l'Energie Atomique, L'Air Liquide, Societe pour l'Etude et l'Exploitation des Procedes Georges Claude, and Compagnie de Construction Mecanique Procedes Sulzer, all of Paris, France, all companies of France
Filed July 21, 1967, Ser. No. 655,221
Claims priority, application France, July 27, 1966, 71,024; June 15, 1967, 110,501
Int. Cl. C01c 1/00; C01b 1/00
U.S. Cl. 23—193       4 Claims

ABSTRACT OF THE DISCLOSURE

Process of isotope exchange between a deuterated gas and ammonia by the monothermal process in which the isotope exchange takes place in two towers between which there is an inlet for the feed gases which pass between an ammonia cracking reactor and an ammonia synthesis reactor in which the pressure in at least one isotope exchange tower is maintained equal to or slightly lower than the pressure of the gases leaving the ammonia cracking reactor.

---

This invention relates to a process of isotope exchange between a deuterated gas and ammonia.

Hydrogen/deuterium isotope separation by means of deuterated hydrogen/ammonia monothermal exchange is a known process and is described, for example, in French patent specification No. 1,237,166.

Up to this time, the ammonia cracking and the ammonia synthesis have been carried out at very different pressures, usually about 50 to 60 bars for the cracking and 350 to 400 bars for the synthesis. Under these conditions, it is necessary to include a compression stage between the cracking and synthesis plants. This compression is always carried out immediately downstream of the cracking plant and a corresponding expansion valve is provided in the ammonia circuit at the outlet from the isotope exchange towers.

The use of this process in industry gives rise to serious technical difficulties in connection with the design of the compressor for the cracking gases. The compressor must use gases (nitrogen, hydrogen, deuterium) which are valuable for the process because they have a high content of the deuterium which is to be recovered and construction of the compressor is therefore necessarily complicated in order to avoid any leakage.

In order to overcome this difficulty we have now developed a process using an improved circuit and according to the present invention we provide, in a process of isotope exchange between a deuterated gas and ammonia by the monothermal process, in which isotope exchange takes place in two towers between which there is an inlet for the feed gases which pass between an ammonia cracking reactor and an ammonia synthesis reactor, the improvement which comprises maintaining the pressure in at least one isotope exchange tower equal to or slightly lower than the pressure of the gases leaving the ammonia cracking reactor.

In the improved process of the invention, the compressor and expansion valve can be inserted either between the two exchange towers or between the exchange tower and the ammonia synthesis plant, depending on the operating conditions. In the latter case, i.e. when the gas leaving the isotope exchange towers is compressed, it is even possible to synthesise some of the ammonia at a very low pressure, of the order of 100 bars, so that all the operations directly connected with the isotope exchange can be carried out at the same pressure.

Figure 1:
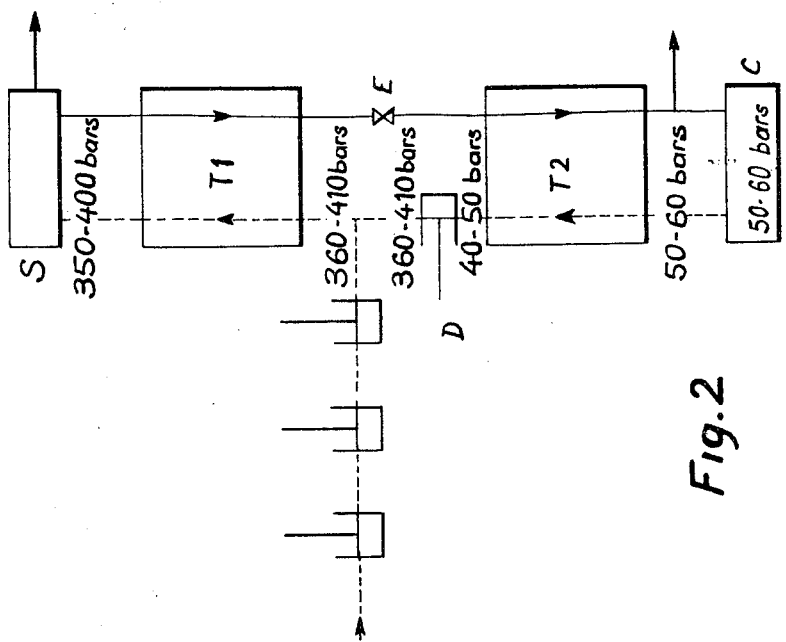
Figure 2:
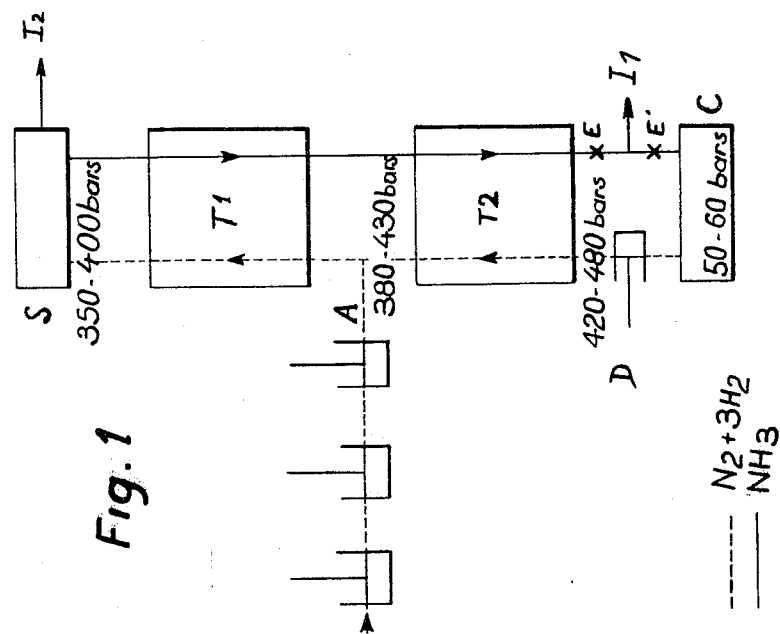
Figure 3:
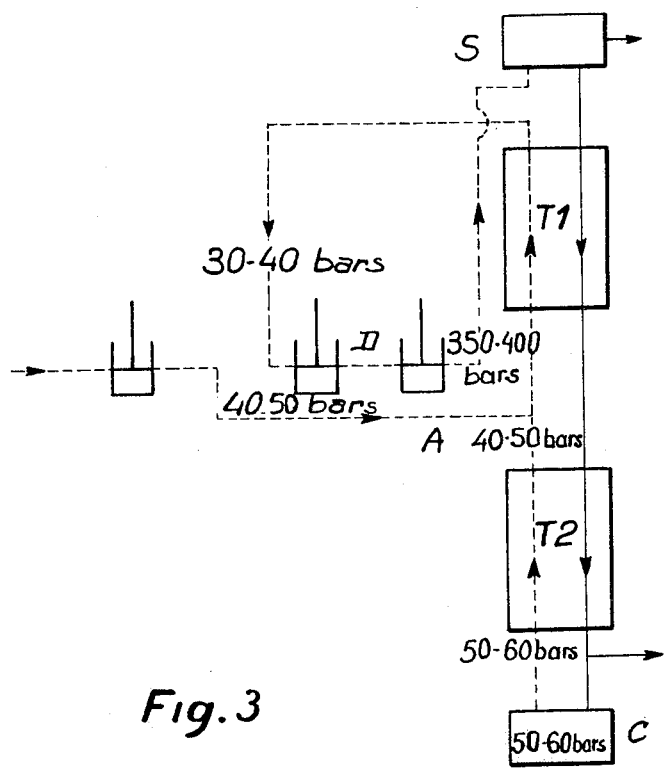

In order that the invention may be more fully understood, preferred embodiments thereof will now be described with reference to the accompanying drawings, in which:

FIGURE 1 shows diagrammatically a conventional exchange plant,

FIGURE 2 shows diagrammatically an isotope exchange plant according to the invention, in which the gases are compressed between the two exchange towers, FIGURE 3 shows diagrammatically an isotope exchange plant according to the invention, in which the gases are compressed in the gas circuit at the outlet from the isotope exchange towers, FIGURE 4 shows diagrammatically an isotope exchange plant according to the invention, in which some of the ammonia synthesis takes place at a low pressure, and FIGURE 5 shows diagrammatically an isotope exchange plant according to the invention, in which the cracking and the synthesis of ammonia at a low pressure take place in two adjacent reactors.

The conventional plant for carrying out monothermal isotope exchange, shown diagrammatically in FIGURE 1, has exchange towers $T_1$ and $T_2$, an ammonia cracking plant C, an ammonia synthesis plant S, an ammonia synthesis gas supply A, and outlet $I_1$ and $I_2$ for ammonia which may or may not be enriched with deuterium.

If the compressor and expansion valve are installed between the two exchange towers $T_1$ and $T_2$, the cycle is as shown in FIGURE 2. The gases leaving the cracking plant at a pressure of the order of 50 to 60 bars pass into the tower $T_2$ where they lose deuterium by counter-current exchange with the ammonia. They are then compressed to a pressure of 360 to 410 bars, mixed with complementary gases prepared elsewhere for ammonia synthesis and sent to tower $T_1$ to take part in another exchange.

Compared with the conventional circuit described above, the advantages of this novel circuit are as follows. A gas mixture with a natural or slightly enriched deuterium content is compressed at D. The design of tower $T_2$ is easier since, although it has a larger diameter, it operates at a much lower pressure. The problem of degassing the ammonia at the outlet from tower $T_2$ is simplified because the quantity of gas dissolved in it is small.

If the compressor and expansion valve are installed at the outlet from tower $T_1$, the cycle is as shown in FIGURE 3. The gases leaving the cracking plant at a pressure of the order of 50 to 60 bars pass into the tower $T_2$ and are mixed at a slightly lower pressure of the order of 40 to 50 bars with the fresh gases prepared elsewhere for the ammonia synthesis. These gases then go, still at a low pressure, into the exchanger $T_1$ where they again lose deuterium in contact with the ammonia. They are then compressed to 350 to 400 bars and sent to the ammonia synthesis plant. The advantages of this novel circuit are as follows. Compression takes place after total exchange with the ammonia, i.e. the gases compressed are those poorest in deuterium. The compressor used can therefore be of a type usual in ammonia synthesis plants. Moreover, in conventional ammonia synthesis plants the gases are always compressed in several stages, and the first compressor can have a delivery pressure of 40 to 50 bars so that the fresh gases leaving this compressor can be directly mixed with the cracking gases leaving the tower $T_2$. Designing the towers $T_2$ and $T_1$ is easier since both operate at a low pressure. The problem of degassing the ammonia at the outlet from exchanger $T_2$ is simplified because the quantity of gas dissolved in it is low.

FIGURE 4 shows two isotope exchange towers $T_1$, $T_2$, an ammonia cracking plant C, an ammonia synthesis gas supply A and two ammonia synthesis plants $S_1$ and $S_2$. In the plant $S_1$ synthesis takes place at a low pressure of the order of 100 bars, and in the plant $S_2$ it takes place after the gases have been compressed to a pressure between 250 and 500 bars, for example.

FIGURE 5 shows isotope exchangers $T_1$, $T_2$, an ammonia synthesis gas supply A, a plant $S_2$ for synthesising ammonia at a pressure of the order of 250 to 500 bars (after compression of the gases) and a complex reactor R including both an ammonia cracking plant which can operate at a pressure of the order of 100 bars and an ammonia synthesis plant which also operates at a pressure of the order of 100 bars.

The modifications indicated diagrammatically in FIGURES 4 and 5 have the following advantages. The heavy water preparation plant is independent from the ammonia plant proper. Where a complex reactor with adjacent cracking and synthesis sections is used, there is maximum recovery of the heat resulting from ammonia synthesis. A lubricated circulating pump can be used in the high-pressure ammonia synthesis circuit ($S_2$), which is not possible if there is only one synthesis plant, since the amide used as the catalyst in the exchange reactions reacts with the oil entrained in the ammonia.

What we claim is:

1. In a process of isotope exchange between a deuterated gas and ammonia by the monothermal process, in which isotope exchange takes place in two towers between which there is an inlet for the feed gases which pass between an ammonia cracking reactor and an ammonia synthesis reactor, the improvement which comprises maintaining the pressure in at least one isotope exchange tower equal to or slightly lower than the pressure of the gases leaving the ammonia cracking reactor.

2. A process according to claim 1, in which the pressure in both towers is equal to or slightly below the pressure of the gases leaving the ammonia cracking reactor.

3. A process according to claim 1 or 2, in which the ammonia required for ensuring reflux into the isotope exchange towers is synthesised at a pressure equal to or slightly below the pressure of the gases leaving the ammonia cracking reactor.

4. A process according to any one of claims 1 to 3, in which the reactors for cracking the ammonia and for synthesising the ammonia required for ensuring reflux into the isotope exchange towers are situated in heat exchange relationship.

References Cited

UNITED STATES PATENTS 3,233,971    2/1966    Delassus et al. _____ 23—204

OSCAR R. VERTIZ, Primary Examiner

H. S. MILLER, Assistant Examiner

U.S. Cl. X.R.

23—210, 260